United States Patent [19]

Chung et al.

[11] Patent Number: 5,413,852
[45] Date of Patent: May 9, 1995

[54] SIXEF™-DURENE POLYIMIDE HOLLOW FIBERS

[75] Inventors: Tai-Shung Chung, Randolph; Edward R. Kafchinski, Winfield; Rohitkumar H. Vora, Westfield, all of N.J.

[73] Assignee: Hoechst Celanese Corp., Somerville, N.J.

[21] Appl. No.: 738,996

[22] Filed: Aug. 1, 1991

[51] Int. Cl.⁶ ............................................. D02G 3/00
[52] U.S. Cl. ................................. 428/364; 428/376; 428/395; 428/397; 428/398
[58] Field of Search ............... 528/353; 428/376, 398, 428/395, 364, 357; 55/16; 210/500.23, 500.27, 500.39

[56] References Cited

U.S. PATENT DOCUMENTS

| | | | |
|---|---|---|---|
| 3,179,636 | 4/1965 | Hendrix | 528/352 |
| 4,631,335 | 12/1986 | Scola et al. | 528/353 |
| 4,983,191 | 1/1991 | Ekiner et al. | 55/16 |
| 4,988,371 | 1/1929 | Jeanes et al. | 55/16 |
| 5,055,116 | 10/1991 | Kohn et al. | 55/16 |
| 5,067,970 | 11/1991 | Wang et al. | 55/68 |

*Primary Examiner*—N. Edwards
*Attorney, Agent, or Firm*—Joseph M. Mazzarese

[57] ABSTRACT

Asymmetric hollow fibers of SIXEF™-Durene, a polyimide made from 2,2-bis[3,4-dicarboxyphenyl] hexafluoropropane dianhydride and 2,3,5,6-tetramethylphenylene diamine monomers, and a process for making such fibers. These uncoated fibers have a separation factor that exceeds 4 for oxygen and nitrogen and a permeance of at least about 50 ppm cc(STP)/(sec cm² cm-Hg). A polymer dope comprising SIXEF™-Durene in a solvent system containing N-methyl-2-pyrrolidone ("NMP") and an organic acid such as propionic acid ("PA") is prepared by polymerizing the polyimide monomers in NMP to form a polyamic acid polymer and imidizing this polymer using the acid anhydride. Water released from the polymer in the imidization reaction converts the anhydride to the organic acid. The dope is wet-spun into hollow fibers using a core solvent such as PA or glycerine; the fibers are coagulated in water.

3 Claims, No Drawings

SIXEF™-DURENE POLYIMIDE HOLLOW FIBERS

BACKGROUND OF THE INVENTION

This invention relates to the field of hollow fibers, especially to asymmetric hollow fibers comprising SIXEF ™ -Durene polyimide (the polymerization product of 2,2-bis[3,4-dicarboxyphenyl] hexafluoropropane dianhydride and 2,3,5,6-tetramethylphenylene diamine monomers).

In creating a gas or liquid separation membrane, it is desirable to have both a high rate of permeation or throughput and a high separation factor. This combination of characteristics permits the effective separation of a relatively large volume of fluid per unit time. Large rates of permeation also allow the membrane to be operated at lower pressures, which improves cost-effectiveness and reduces wear and tear.

Highly porous membranes tend to be very permeable, but do a poor job of separating fluids into their components. Less porous, dense membranes can be more selective, but at the cost of reduced throughput. Asymmetric membranes represent a compromise between the two in that they generally have a thin, dense separation layer and a less dense, more permeable layer.

Asymmetric membranes are often chosen for separation applications because they may provide a good combination of permeation and separation. Hollow fibers having a dense skin and a porous body can be used to make such membranes. However, such fibers generally need to be coated with another highly permeable substance to achieve acceptable selectivities.

U.S. Pat. No. 4,705,540 issued to Hayes describes polyimide gas separation membranes made by casting a polyimide solution on a plate. The polyimides described by Hayes include aromatic fluoropolymers.

U.S. Pat. No. 4,871,494 issued to Kesting, et al. describes a process for forming asymmetric gas separation membranes having graded density skins. This process comprises dissolving a hydrophobic polymer in a Lewis acid:base solvent system wherein the Hildebrand parameters of the solvent species and the polymer are within less than 1.5, creating a dope from this solution, forming the dope into an appropriate shape, coagulating the dope, desolvating, washing and drying. According to the patent, the resultant membrane has increased free volume as evidenced by a glass transition temperature greater than the bulk glass transition temperature of the polymer.

U.S. Pat. No. 4,881,954 issued to Bikson, et al. describes permeable membranes for enhanced gas separation in which an asymmetric porous support is coated with a separation layer. The support is made asymmetric prior to coating to provide mechanical stability and a uniform support surface.

U.S. patent application No. 686,739 filed on Apr. 17, 1991 by Chung, et al. describes a method for making asymmetric hollow fibers from fluoropolymers. The outer layer of these fibers is coated with a highly permeable substance to achieve high selectivities.

SUMMARY OF THE INVENTION

The present invention comprises asymmetric hollow fibers consisting essentially of SIXEF ™ -Durene, a polyimide made from 2,2-bis[3,4-dicarboxyphenyl] hexafluoropropane dianhydride and 2,3,5,6-tetramethylphenylene diamine monomers and having the formula

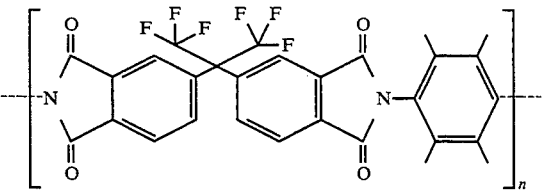

and a process for making such fibers. These uncoated fibers have a separation factor that exceeds 4, and preferably exceeds 5, for oxygen and nitrogen and an oxygen permeance of at least about 50 ppm cc(STP)/(sec cm$^2$ cm-Hg).

In the process of this invention, a polymer dope comprising SIXEF ™ -Durene in a solvent system containing N-methyl-2-pyrrolidone ("NMP") and an organic acid such as propionic acid ("PA") is prepared by polymerizing the polyimide monomers in NMP to form a polyamic acid polymer and imidizing this polymer using the acid anhydride, e.g. propionic anhydride. Water released from the polymer in the imidization reaction converts the anhydride to acid. The dope is wet-spun into hollow fibers; the fibers are coagulated in water.

An object of the present invention is to provide a hollow fiber suitable for use in gas separation membranes.

Another object of the present invention is to provide a novel asymmetric hollow fiber comprising SIXEF ™ -Durene.

A further object of the present invention is to provide an uncoated hollow fiber that has both a high separation factor for O$_2$/N$_2$ and a high permeance, and a process for making same.

Yet another object is to provide a relatively simple and inexpensive method for making a permeable, highly selective hollow fiber.

Other objects of the present invention will be apparent to those skilled in the art from the following description and claims.

DETAILED DESCRIPTION OF THE PREFERRED EMBODIMENTS

In a preferred embodiment of the present invention, a polymer dope is made by polymerizing 2,2-bis[3,4-dicarboxyphenyl] hexafluoropropane dianhydride and 2,3,5,6-tetramethylphenylene diamine monomers in NMP to form a polyamic acid

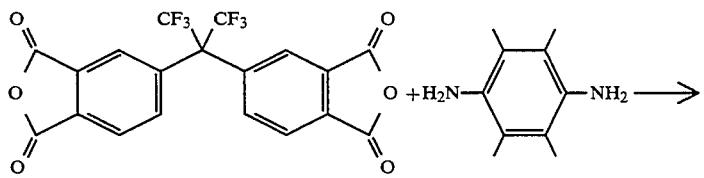

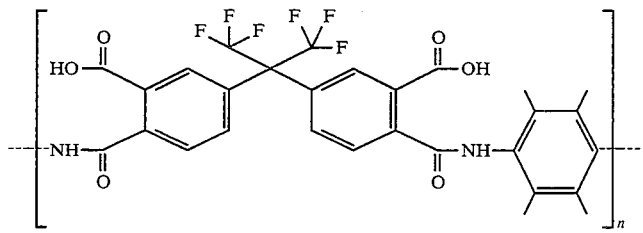

which is then imidized using propionic anhydride and a base catalyst, such as β-picolin, or an acid catalyst, to form SIXEF ™ -Durene (a polymer made by the Hoechst Celanese Corporation). Acetic anhydride or butyric anhydride may be substituted for the propionic anhydride in the process of the present invention.

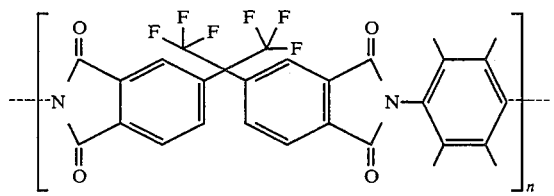

The monomers are reacted in approximately equimolar amounts at room temperature, i.e. about 20°-30° C., for about 15-25 hours, preferably about 20 hours; the reaction is carried out in NMP, with an approximate weight ratio of NMP to solids of between 75:25 and 88:12, preferably about 80:20; a greater or lesser amount of solvent may be used, provided the monomers are concentrated enough to polymerize effectively but not so concentrated that a fluid dope cannot form. The imidization reaction is also carried out at room temperature, for about 15-22 hours, preferably about 16-19 hours. The exact time and temperature of the reactions may be varied provided that the same product results; reactions run at higher temperatures generally require less time to go to completion.

Water released during the imidization reaction converts the anhydride to PA; therefore, the resulting dope is a solution of the polyimide in NMP/PA.

The polymer dope is then wet-spun using a conventional die for forming hollow fibers, with glycerine or PA used as the hollow fiber core solvent and water as the fiber coagulant. The dope goes directly from the die into a water bath to quickly freeze the fiber structure and form a dense outer layer of polyimide. The die temperature and the bath temperature are typically about room temperature, preferably between about 20° C. and about 60° C. for the die and between about 20° C. and about 50° C. for the bath, although other temperatures may be used; those skilled in the art will be able to determine the useful temperature ranges for a given system. Conventional means then may be used to collect the hollow fiber.

One goal of the process of the present invention is to provide a thin, dense outer layer on the fiber. This layer is essential to provide an asymmetric fiber that is useful in fluid separations. If this layer is too thick the fiber will not have sufficient permeability, and if it is too thin the selectivity may be too low. The dense outer layer is formed when the water bath coagulates the fiber; the exposed outer surface of the fiber forms a denser structure than the inner fiber where coagulation proceeds more slowly. The thickness of the dense outer layer should be less than about 3 microns, preferably between about 0.10 and 2.2 microns. The permeance of the fibers of this invention generally will be about 50-350 ppm cc(STP)/(sec $cm^2$ cm-Hg).

Preferably, no air gap should exist between the die and the water bath, because such a gap will cause poorer selectivity, i.e., the fiber will have a lower separation factor for $O_2/N_2$.

The core solvent is preferably glycerine or PA, or another liquid that will not promote coagulation in the center of the fiber. Examples of other suitable core solvents include acetic acid, butyric acid, and acetic, propionic or butyric anhydride. Mixtures of the acids and anhydrides may also be used.

The fiber may be spun in any suitable hollow fiber die apparatus. Those skilled in the art will be able to determine which apparatus are suitable.

The hollow fibers of the present invention will have a separation factor of at least 4.0, and preferably about 4.5 or higher, for oxygen and nitrogen; this separation factor is defined as the ratio of the permeance of oxygen to the permeance of nitrogen. More preferably, the separation factor will be at least about 5.0. Fibers having separation factors of about 5.2-6.0 have been prepared according to this invention.

The following Examples illustrate several embodiments of the present invention. However, the invention should not be construed as limited to the embodiments illustrated.

EXAMPLE I

About 0.2 mole of each monomer, 2,2-bis[3,4-dicarboxyphenyl] hexafluoropropane dianhydride and 2,3,5,6-tetramethylphenylene diamine, were placed in a reaction vessel with 487 grams of NMP. The monomers reacted for about 20 hours at room temperature to form a polyamic acid in NMP (20% solids content by weight).

A 300-gram quantity of this polyamic acid/NMP was combined with 73.4 grams of β-picolin (an initiator) and 28.2 grams of propionic anhydride and reacted for about 17 hours at room temperature to form a 401.6-gram polymer dope of 14.1% SIXEF ™ -Durene polyimide in NMP/PA. This dope was then spun into several hollow fibers; each fiber was quenched in a water bath after spinning. The following table shows the results of spinning this dope under various conditions:

| Core solvent | Air gap | P/L for $O_2$ | α |
| --- | --- | --- | --- |
| Glycerine | None | 127 | 4.61 |
| | | 46.5 | 5.3 |
| | | 56.7 | 5.6 |
| | 6-inch | 2443 | 1.08 |

-continued

| Core solvent | Air gap | P/L for O₂ | α |
|---|---|---|---|
| Propionic acid | None | 47.7 | 5.2 |

α = O₂/N₂ separation factor
P/L for O₂ = permeance of oxygen in ppm cc (STP)/(sec cm² cm-Hg)

The tabulated data shows that wet-spun (no air gap) fibers have much better selectivities, or separation factors, than those spun with a 6″ air gap between the die and the water bath. It is also shown that both PA and glycerine core solvents can be used to produce fibers having both high separation factors and good permeance.

EXAMPLE II

About 1.1 mole of each monomer, 2,2-bis[3,4-dicarboxyphenyl] hexafluoropropane dianhydride and 2,3,5,6-tetramethylphenylene diamine, were placed in a reaction vessel with 2.68 Kg of NMP. The monomers reacted for about 21 hours at room temperature to form a polyamic acid in NMP (20% solids content by weight).

A 2000-gram quantity of this polyamic acid/NMP was combined with 489.6 grams of β-picolin (an initiator) and 188.2 grams of propionic anhydride and reacted for about 17 hours at room temperature to form a 2677.8-gram polymer dope of 14.1% SIXEF ™ - Durene polyimide in NMP/PA. This dope was then wet-spun into hollow fibers as in Example I, using glycerine as the core solvent, with the following results:

| P/L for O₂ | α |
|---|---|
| 201 | 4.6 |
| 292 | 4.55 |
| 84 | 5.0 |

α = O₂/N₂ separation factor
P/L for O₂ = permeance of oxygen in ppm cc (STP)/(sec cm² cm-Hg)

Many variations of the present invention not illustrated herein will occur to those skilled in the art. The present invention is not limited to the embodiments illustrated and described herein, but encompasses all the subject matter within the scope of the appended claims.

We claim:

1. An asymmetric hollow fiber for use in separation membranes consisting essentially of a polyimide of the formula

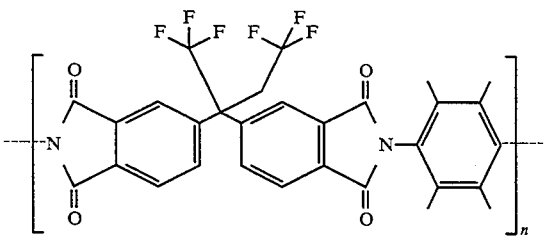

said fiber having a dense outer layer at least about 0.10 micron but less than 3 microns thick and having a separation factor of at least 4.0 for oxygen and nitrogen and an oxygen permeance of at least 50 ppm cc(STP)/(sec cm² cm-Hg).

2. A hollow fiber according to claim 1 wherein said separation factor is at least 5.0.

3. A hollow fiber according to claim 1 wherein said separation factor is about 5.2–6.0.

* * * * *